United States Patent [19]

De Vaan

[11] Patent Number: 5,486,884
[45] Date of Patent: Jan. 23, 1996

[54] REFLECTING IMAGE PROJECTION SCREEN AND IMAGE PROJECTION SYSTEM COMPRISING SUCH A SCREEN

[75] Inventor: Adrianus J. S. M. De Vaan, Eindhoven, Netherlands

[73] Assignee: U.S. Philips Corporation, New York, N.Y.

[21] Appl. No.: 218,482

[22] Filed: Mar. 25, 1994

[30] Foreign Application Priority Data

Oct. 6, 1993 [BE] Belgium .................................. 09301042

[51] Int. Cl.[6] .................................................. G03B 21/00
[52] U.S. Cl. .......................... 353/122; 353/20; 359/101; 359/443
[58] Field of Search ...................... 353/122, 20; 359/105, 359/449, 452, 443, 70, 101

[56] References Cited

U.S. PATENT DOCUMENTS

| 4,127,322 | 11/1978 | Jacobson et al. | 353/31 |
|---|---|---|---|
| 4,249,801 | 2/1981 | Masubuchi | 359/101 |
| 5,029,986 | 7/1991 | De Vaan | 350/338 |
| 5,193,015 | 3/1993 | Shanks | 359/443 |

FOREIGN PATENT DOCUMENTS

| 0266184 | 4/1988 | European Pat. Off. . |
|---|---|---|
| 0295913 | 12/1988 | European Pat. Off. . |
| 0005550 | 1/1977 | Japan | 359/101 |
| 5107660 | 4/1993 | Japan | 353/20 |

OTHER PUBLICATIONS

Mazkedian et al., "On the Circular Dichroism and Rotary Dispersion in Cholesteric Liquid Crystals with a Pitch Gradient", Le Journal de Physique Tome 37, Jun. 1976 pp. 731–736.

PHN 14,345—Corresponds to EPA 93200055.7.

"Polarizing Color Filters made from Cholesteric LC Silicones" by R. Maurer et al, in SID International Symposium 1990, Digits of Technical Papers, pp. 110–113.

"Retardation Film for STN–LCD's 'NRF'" by the firm of Nitto Denko in SID '92 Exhibit Guide, Society for Information Display, May 17–22, 1992, Boston, Mass., USA.

*Primary Examiner*—William C. Dowling
*Attorney, Agent, or Firm*—John C. Fox; Norman N. Spain

[57] ABSTRACT

A reflecting image projection screen (1) is described, as well as an image projection system (17) in which such a projection screen (1) is used. Viewed from the front side (3) of the projection screen (1), the image projection screen comprises, in this order, a linear polarizer (9), a λ/4 plate (11), a reflecting polarizer (13) in the form of a cholesteric filter and a reflecting layer (15) which is also active as a depolarizing diffuser layer. By combining a cholesteric filter (13) with a depolarizing reflecting layer (15), an image projection screen is obtained which is highly reflective to the direction of polarization supplied by the image projector (19) and substantially absorbs the other direction of polarization.

15 Claims, 2 Drawing Sheets

REFLECTING IMAGE PROJECTION SCREEN AND IMAGE PROJECTION SYSTEM COMPRISING SUCH A SCREEN

BACKGROUND OF THE INVENTION

The invention relates to a reflecting image projection screen comprising a polarizer and a reflecting layer for reflecting radiation which is incident on the reflecting layer via the polarizer.

The invention also relates to an image projection system comprising such a reflecting image projection screen.

An image projection system having a reflecting image projection screen of the type described in the opening paragraph is known from European Patent Application EP 0,295,913 A2. The image projection screen described in this Application is a reflecting image projection screen and may be implemented, for example as a metal screen. Since not only radiation supplied by the image projector, hereinafter referred to as signal light, but also ambient light is incident on the image projection screen and is reflected by this screen into the audience room, the ambience of this screen is to be considerably darkened in order that an image which is rich in contrast can be observed. For this reason the side of the image projection screen facing the viewer is provided with a polarizer which absorbs substantially 50% of the ambient light. In this manner the reduction of contrast of the image due to ambient light is reduced. The illumination system of the image projector comprises a radiation source whose radiation is split into p and s-polarized radiation by a polarization-sensitive beam splitter. One of the two linearly polarized beams is incident on a liquid crystal element in which the direction of polarization of the beam is modulated in conformity with the image generated by the element. Subsequently, the modulated radiation is projected in the form of an image on the image projection screen via a projection lens. Since the projected signal light is linearly polarized in the direction of polarization of the screen polarizer, this light is substantially completely passed to the audience room by the polarizer on the screen after reflection on the reflecting layer.

In the system described radiation incident on the image projection screen is reflected at an angle whose size is substantially equal, but opposite to the angle of incidence. This is the case, inter alia, in image projection systems in which the image projector is secured, for example to the ceiling and in which the screen is a specularly reflecting screen, for example a metal screen. The radiation is then reflected towards the audience room which is at a lower level than the projection screen.

Due to the required mutual positioning of the projector, the projection screen and the viewer(s), a metal screen is applicable to a limited extent only. In practice it is generally desired to have more freedom in the positions of said system components and the viewers. A frequent arrangement is the one in which, for example, a portable projector is placed at the viewers' eye level, while it is further desired that the projected image has a good quality from different positions, notably in the horizontal plane.

OBJECTS AND SUMMARY OF THE INVENTION

It is an object of the invention to provide a novel type of image projection screen satisfying the above-mentioned requirements and in which contrast reduction due to ambient light is obviated to a considerable extent.

To this end the reflecting image projection screen according to the invention is characterized in that the reflecting layer is a depolarizing diffuser layer and in that the image projection screen includes a cholesteric filter between the polarizer and the reflecting layer and a $\lambda/4$ plate between the polarizer and the cholesteric filter, the direction of polarization of the radiation from the cholesteric filter corresponding to the direction of polarization of the polarizer after conversion by the $\lambda/4$ plate.

A diffusely reflecting layer spreads the reflected signal light over a large spatial angle so that an image having a good quality can be observed from different positions, while there is a great freedom in the mutual positioning of projector and projection screen. The reflection through a large spatial angle may, however, lead to a reduction of the intensity of the signal light reflected towards the audience room. By making use of a diffusely reflecting layer, which also has a depolarizing effect, in combination with a cholesteric filter, a contrast which is at least as high as with a metal screen at the same ambient light can be achieved in spite of the reflection through a large spatial angle, while the freedom in position of the projector, the projection screen and the viewers has increased considerably.

Depolarizing is herein understood to mean the at least partial conversion of radiation having a given state of polarization into unpolarized radiation, i.e. radiation having different polarization components.

Cholesteric filters are optical filters having an optical layer of a liquid crystalline material with a cholesteric order. This means that the molecules of the material are ordered to a helical or helix-like structure with a pitch p. After such a material has been provided in the form of a thin, optically active layer between two parallel substrates, the helix-like structure is aligned in such a way that the axis of the helix will be transverse to the layer. The alignment of the helix can be improved by providing an orientation layer on the facing surfaces of the substrates.

The $\lambda/4$ plate converts the linear polarization of the light into a circular polarization which is necessary for the cholesteric filter, and conversely.

When an unpolarized radiation beam, originating from the depolarizing diffuser layer, is incident on such a filter, a circularly polarized radiation component having a direction of rotation (levorotatory or dextrorotatory) corresponding to the direction of the molecular helix whose wavelength corresponds to the pitch p of the helix will be reflected. This state of polarization will be further referred to as the state of polarization which is unsuitable for the system. A circularly polarized component having the opposite direction of rotation will be passed and reach the audience room via the $\lambda/4$ plate and the polarizer. This state of polarization will be further referred to as the state of polarization which is suitable for the system.

Consequently, light of the state of polarization which is unsuitable for the system is not absorbed but again reflected towards the depolarizing layer by the cholesteric filter. This light is subsequently depolarized by this layer and again sent to the cholesteric filter so that a part thereof acquires the state of polarization which is suitable for the system and can thus be passed on to the audience room via the cholesteric filter. The remaining part is again reflected by the filter towards the reflecting layer so that, due to the depolarization on said layer, again a part thereof is incident in the correct state or polarization on the cholesteric filter so as to be passed on to the audience room. Thus, for example, 80% of the light of the wavelength band for which the cholesteric filter is active can be brought to the desired state of polarization.

By providing a cholesteric filter in an image projection screen with a depolarizing reflecting layer and with a linear polarizer, a screen is obtained which has a high reflection for the direction of polarization supplied by the projector and which is substantially absorbing for the other direction of polarization. In this way the reflection of the ambient light can be reduced considerably also for a projection screen having a diffusely reflecting layer, so that the contrast of the image may be at least as high as for a metal screen at the same ambient light.

It is to be noted that it is known per se to use cholesteric filters as reflecting polarizers. Cholesteric filters are known, for example from the article "Polarizing Color Filters made from Cholesteric LC Silicones" by R. Maurer et al. in SID International Symposium 1990, Digest of Technical Papers, pp. 110–113. The cholesteric filters described in this article have an optically active layer comprising a liquid crystalline material with a cholesteric order based on silicones. Said article by Maurer does not propose to combine the cholesteric filter with a depolarizing diffusely reflecting layer in order to suppress disturbing unpolarized radiation.

A preferred embodiment of the reflecting image projection screen according to the invention is characterized in that the reflecting layer is implemented as a beaded screen.

By implementing the reflecting layer as a beaded screen, the reflected radiation is concentrated in a limited lobe. In this way, the radiation presented to the filter is concentrated in a given angular area. Since the effectiveness of a cholesteric filter as a polarizer decreases within a given wavelength band with an increasing angle of incidence of the radiation to be polarized, the use of a beaded screen has the result that it is sufficient to use a cholesteric filter with a smaller bandwidth so as to cover the same wavelength range.

An embodiment of the reflecting image projection screen according to the invention is characterized in that the cholesteric filter is active in at least an essential part of the complete visible wavelength range.

In this way the afore-mentioned efficiency of 80% holds for the complete visible wavelength range. Moreover, the radiation passed by the cholesteric filter is suitable for illuminating both a monochrome and a color display panel.

A first embodiment of the reflecting image projection screen according to the invention having a wide-band cholesteric filter is characterized in that the cholesteric filter is composed of a plurality of layers of liquid crystalline material, each layer being active for a different wavelength band, which wavelength bands jointly cover substantially the visible wavelength range.

A preferred embodiment of the reflecting image projection screen according to the invention having a wide-band cholesteric filter is characterized in that the cholesteric filter has a single layer of liquid crystalline polymer material, within which layer the pitch of the molecular helix varies across the layer thickness between two values which correspond to the lower limit and the upper limit, respectively, of the wavelength band which is required to cover at least the complete visible wavelength range.

This embodiment is based on the recognition that the pitch of the molecular helix can be continuously varied in a liquid crystalline polymer material having a cholesteric order. As described in Applicant's U.S. application Ser. No. 08/179,420, filed Jan. 10, 1994, the contents of which Application are herein incorporated by reference, it is possible to vary the pitch sufficiently within a single layer so that it is no longer necessary to stack a number of layers each being formed by a liquid crystalline material and having a different reflection band. By continuous variation of the pitch within a single layer, it is sufficient to use a layer thickness which is smaller than the total layer thickness required for stacking different layers so as to cover the same reflection band, so that a filter having a better optical quality can be obtained. In fact, the quality of such filters decreases relatively rapidly with an increasing number of layers due to errors which are typical of cholesterics and due to loss of molecular order. Moreover, the viewing angle dependence of the filter increases with an increasing thickness. This means that the effectiveness of the filter decreases considerably at larger layer thicknesses for radiation which is incident at an angle which is larger than a given angle of incidence.

An embodiment of the reflecting image projection screen according to the invention having a wide-band cholesteric filter is characterized in that at least a plurality of layers of the cholesteric filter comprises a liquid crystalline polymer material, within which layers the pitch of the molecular helix varies across the layer thickness between two values which correspond to the lower limit and the upper limit, respectively, of the reflection band of the relevant layer.

By varying the pitch of at least a number of layers, the reflection band of the relevant layers is increased. Consequently, it is sufficient to use a smaller number of layers so as to cover the complete visible wavelength range, so that the above-mentioned advantages of a smaller number of filter layers are also valid in this case. This embodiment can be used, for example for cholesteric materials whose pitch of the helix within a single layer cannot be varied sufficiently to cover the desired wavelength range. Preferably, each layer is active in a different wavelength range so that the cholesteric filter may have a limited thickness.

The invention also relates to an image projection system comprising a reflecting image projection screen as described hereinbefore, and to a projector for projecting an image on the image projection screen, and is characterized in that the projection screen is a screen as described hereinbefore and in that the direction of polarization of the radiation supplied by the image projector corresponds to the direction of polarization of the linear polarizer in the projection screen.

An image projector is herein understood to mean a device which is provided with an image display system and optical means for projecting the image generated by this system on an image projection screen.

The image display system may be, for example a liquid crystal display panel (LCD) or may be constituted by three liquid crystal display panels and a plurality of color-selective beam-splitting and beam-recombining elements. Such image display systems supply radiation having a defined direction of polarization. If this defined direction of polarization corresponds to the direction of polarization of the linear polarizer on the image projection screen, which direction is in its turn coupled to the rotational direction of polarization of the cholesteric filter, this radiation is passed undisturbed by the two polarizers so that the intensity of the image does not decrease.

The image display system may also be constituted by one or more cathode ray tubes coated with an electro-optical layer as described in U.S. Pat. No. 4,127,322.

The generated image may be a video image, a graphic image, data or a combination thereof.

An embodiment of the image projection system according to the invention is characterized in that an adjustable polarization rotator is arranged in the light path between the illumination system and the image projection screen.

By adding such an adjustable polarization rotator, the direction of polarization supplied by the projector can be adapted to that of the polarizer in the reflecting image projection screen so that the light efficiency of the image projection can be increased considerably.

A suitable embodiment of the image projection screen according to the invention is characterized in that the adjustable polarization rotator comprises a first and a second $\lambda/4$ plate, the first $\lambda/4$ plate being oriented at an angle of 45° with respect to the direction of polarization of the light beam supplied by the projector and the second $\lambda/4$ plate being rotatable so as to adapt the direction of polarization supplied by the image projector to the direction of polarization of the reflecting image projection screen.

The first $\lambda/4$ plate converts the linearly polarized radiation from the image display system into circularly polarized radiation. This circularly polarized radiation is subsequently converted by the second $\lambda/4$ plate into linearly polarized radiation whose direction of polarization is adapted to the direction of polarization of the screen. When a color image projection system is used, the $\lambda/4$ plates are preferably achromatic.

When the image display system operates with circularly polarized light instead of linearly polarized light, the first $\lambda/4$ plate may alternatively be arranged between the beam splitter and the image display panel instead of behind the image display panel.

These and other aspects of the invention will be apparent from and elucidated with reference to the embodiments described hereinafter.

DESCRIPTION OF THE PREFERRED EMBODIMENT

Figure 1:
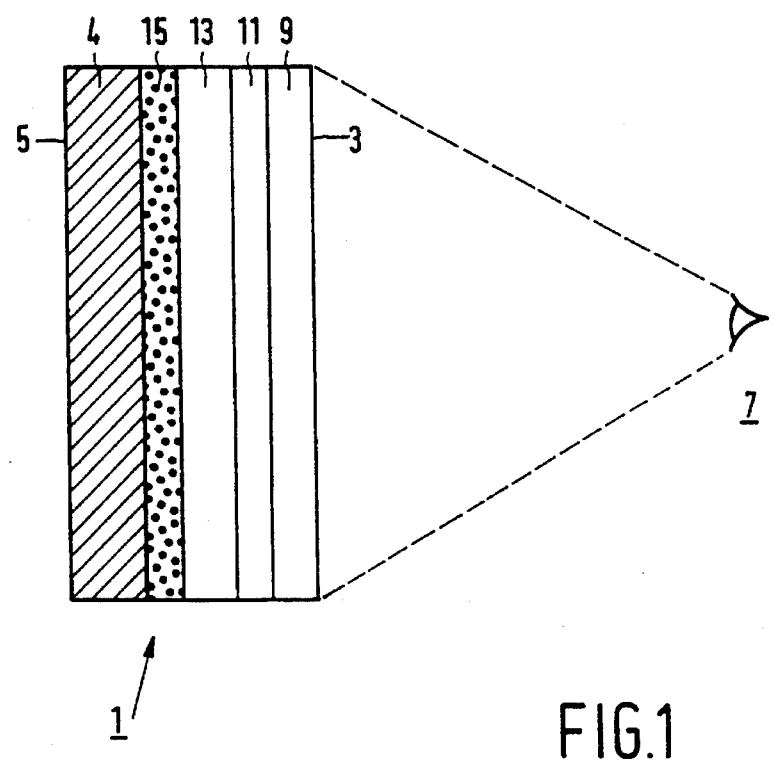
FIG. 1 shows an embodiment of a reflecting image projection screen according to the invention.

FIG. 1 shows diagrammatically a reflecting image projection screen 1 having a front side 3 and a rear side 5 for reflecting light incident on the front side 3 towards an audience room 7. However, the radiation incident on the projection screen does not only consist of radiation coming from an image projector, which radiation is further referred to as signal light, but also of ambient light. A major part of this ambient light is also reflected by the image projection screens to the audience room, resulting in a considerable reduction of contrast of the image. In order that an image which is sufficiently rich in contrast can be observed, the audience room is to be darkened considerably.

Moreover, image projection systems using a metal screen are preferably suitable for arrangements where the image projector is secured to the ceiling. The radiation beam from the projector is reflected by the screen towards the audience room at substantially equal but opposite angles, which audience room is located at a lower level than the screen. For, for example, portable systems, with the viewer and the projector being at approximately the same level, it is relatively cumbersome to project the image at a position suitable for the viewer when systems with a metal screen are used.

With an image projection screen according to the present invention the light is reflected at a large spatial angle into the audience room, so that the freedom of the mutual position of the projector, the projection screen and the viewer has increased considerably. Moreover, a contrast which is at least as high as with a metal screen is achieved with the same ambient light.

Starting from the front side 3, the image projection screen 1 is therefore composed of a first, linear polarizer 9, a $\lambda/4$ plate 11, a second polarizer 13 in the form of a cholesteric filter and a reflecting layer 15 which also operates as a depolarizing diffuser layer. This means that polarized radiation incident on this layer 15 is not only diffusely reflected but is also at least partly converted into unpolarized radiation, in other words, into radiation having different polarization components. The above-mentioned components 9, 11, 13 and 15 are arranged on a support 4.

When such an image projection screen is irradiated by signal light having a defined direction of polarization which corresponds to the direction of polarization of the linear polarizer 9, the polarizer 9 will pass substantially 90% of this signal light, while substantially 50% of the unpolarized ambient light will be absorbed. Subsequently, the linearly polarized light consisting of signal light and ambient light leaving the polarizer 9 is incident on a $\lambda/4$ plate 11 which converts the linearly polarized light into circularly polarized radiation, for example dextrorotatory radiation. The subsequent cholesteric filter 13 is transparent to this light and passes the dextrorotatory circularly polarized radiation component to the reflecting layer 15. The radiation is not only diffusely reflected but also depolarized on this layer 15. In other words, the dextrorotatory circularly polarized radiation is converted into radiation having dextrorotatory and levorotatory circularly polarized radiation components. The dextrorotatory component thereof is passed by the cholesteric filter 13, while the levorotatory component is reflected again by the filter 13 to the reflecting layer 15 so as to be depolarized, reflected and partly passed again by the filter. Since the light is also depolarized upon reflection on the screen and since the screen is provided with a cholesteric filter, a possible reduction of intensity due to the diffuse reflection is amply compensated for. Due to the repeated process of reflections and depolarization within the screen, a high percentage, for example 80% of the signal light incident on the screen is reflected towards the audience room.

It is true that the same percentage of the ambient light incident on the projection screen and passing through the polarizer 3 is reflected to the audience room, but since this light is only half that of the total ambient light, only 40% of the ambient light incident on the screen is reflected.

The known cholesteric filters are only active as reflecting polarizers within a relatively limited wavelength band, for example 50 nm. Radiation having a wavelength outside this wavelength band is passed unpolarized, which means that the filter operates as a polarizer only in a given wavelength range. For color image projection systems it is, however, desirable that the cholesteric filter can convert the state of polarization for the complete visible wavelength range whose wavelength bandwidth is, for example 380 nm.

The width of the wavelength band $\Delta\lambda$ is given by $\Delta\lambda=\lambda_0\Delta n/\bar{n}$ in which $\Delta n=n_e-n_o$ is the double refraction, while $n_e$ and $n_o$ are the extraordinary and ordinary refractive index, respectively, and $\bar{n}=(n_e+n_0)/2$ is the average refractive index. $\lambda_0$ is the central wavelength of the selective reflection band at perpendicular incidence of the radiation and is given by $$\lambda_0 = \bar{n}p = \frac{(n_e + n_0)}{2} p,$$

in which p is the pitch of the molecular helix of the filter. The effectiveness of a cholesteric filter as a polarizer decreases with an increasing angle of incidence of the radiation to be polarized, in other words, a cholesteric filter is viewing angle-dependent. In fact, if the angle of incidence is changed, there is a shift of the reflection band. The effectiveness also decreases with an increasing thickness of the filter.

A cholesteric filter which is active in the complete visible wavelength range can be realised in different manners.

A first possibility is to stack a plurality of narrow-band cholesteric layers each having a different reflection band. The composite filter then has a total reflection band width which is equal to the sum of the reflection bandwidths of the individual layers.

Due to the scattering effect of the reflecting layer 13, the radiation incident on this layer is scattered through an angular range of substantially 180°. As a result, the reflection band of the cholesteric filter required for the visible wavelength range is to be increased by a fictitious wavelength band so as to be effective for large angles of incidence as well. The shift of the reflection band as a function of the angle of incidence is, for example 2 nm per degree.

To be able to operate as a polarizer in the complete visible wavelength range, while allowing for the shift of the reflection band of the cholesteric filter due to the viewing angle dependence, the total reflection band should be [380 nm+(180°×2 nm/°)]=740 nm. Since the width of the reflection band is 50 nm on average for a known cholesteric layer, a conventional stacked filter should have approximately 15 layers.

A second possibility is to manufacture the cholesteric filter from a single layer of liquid crystalline polymer material, in which the pitch p of the molecular helix varies across the layer thickness between a lower limit and an upper limit so that the resultant reflection bandwidth corresponds to the bandwidth which is required for the filter to be operative in the complete visible wavelength range. As compared with a stacked filter, a single-layer filter has the advantage of a better optical quality. In fact, when stacking layers, the optical quality decreases with an increasing number of layers due to the presence of errors in the cholesterics and due to the loss of a planar molecular order. Moreover, the viewing angle dependence increases with an increasing thickness. This means that the effectiveness of the filter decreases considerably at larger layer thicknesses for radiation which is incident at an angle which is larger than a given angle of incidence. In order that a cholesteric layer having a reflection bandwidth of 50 nm should have a polarizing effect, the layer should have a minimum thickness of 5 μm. Consequently, this yields a minimum thickness of 75 μm for a filter which is stacked with fifteen narrow-band layers.

For a single-layer cholesteric filter having a varying pitch a layer thickness of 20 μm is sufficient for this filter to be effective as a polarizer, which enhances the effectiveness of the filter. A method of manufacturing a single-layer cholesteric filter having a pitch varying across the layer thickness is described in the previously mentioned, U.S. application Ser. No. 08/179,420.

An embodiment of the cholesteric filter having a better optical quality and a viewing angle which is less dependent than that of a cholesteric filter comprising a relatively large number of narrow-band layers with a constant helix pitch, is a cholesteric filter manufactured from a smaller number of layers in which the pitch p of the molecular helix varies across the layer thickness in at least a number of these layers. The reflection bandwidth of the relevant layers may be increased to, for example 150 nm. In that case the number of layers required for the visible wavelength range can be reduced from 15 to 5.

By implementing the reflecting layer 15 as a beaded screen, the radiation is concentrated in a lobe. As a result, the radiation is presented to the filter within a limited spatial angle, which leads to a reduction of the total reflection band of the cholesteric filter. This will be illustrated with reference to a numerical example. For, for example an image projection screen having a diagonal of 1 m at a projection distance of 4 m, the maximum angle of incidence is given by arc tan ¼ ≈ 14°. This means that the number of layers which is sufficient to cover the complete visible wavelength range is given by [380 nm+(14°×2 nm/°)]/50 nm ≈ 8 layers instead of the above-mentioned fifteen layers for layers having a narrow reflection band, and by [380 nm+(14°×2 nm/°)/150 nm ≈ 3 layers instead of five layers for layers having a larger reflection band. For a single-layer filter having a varying pitch, the lower-limit and upper-limit values of the pitch p will be closer together due to the use of a retroreflective layer.

Figure 2:
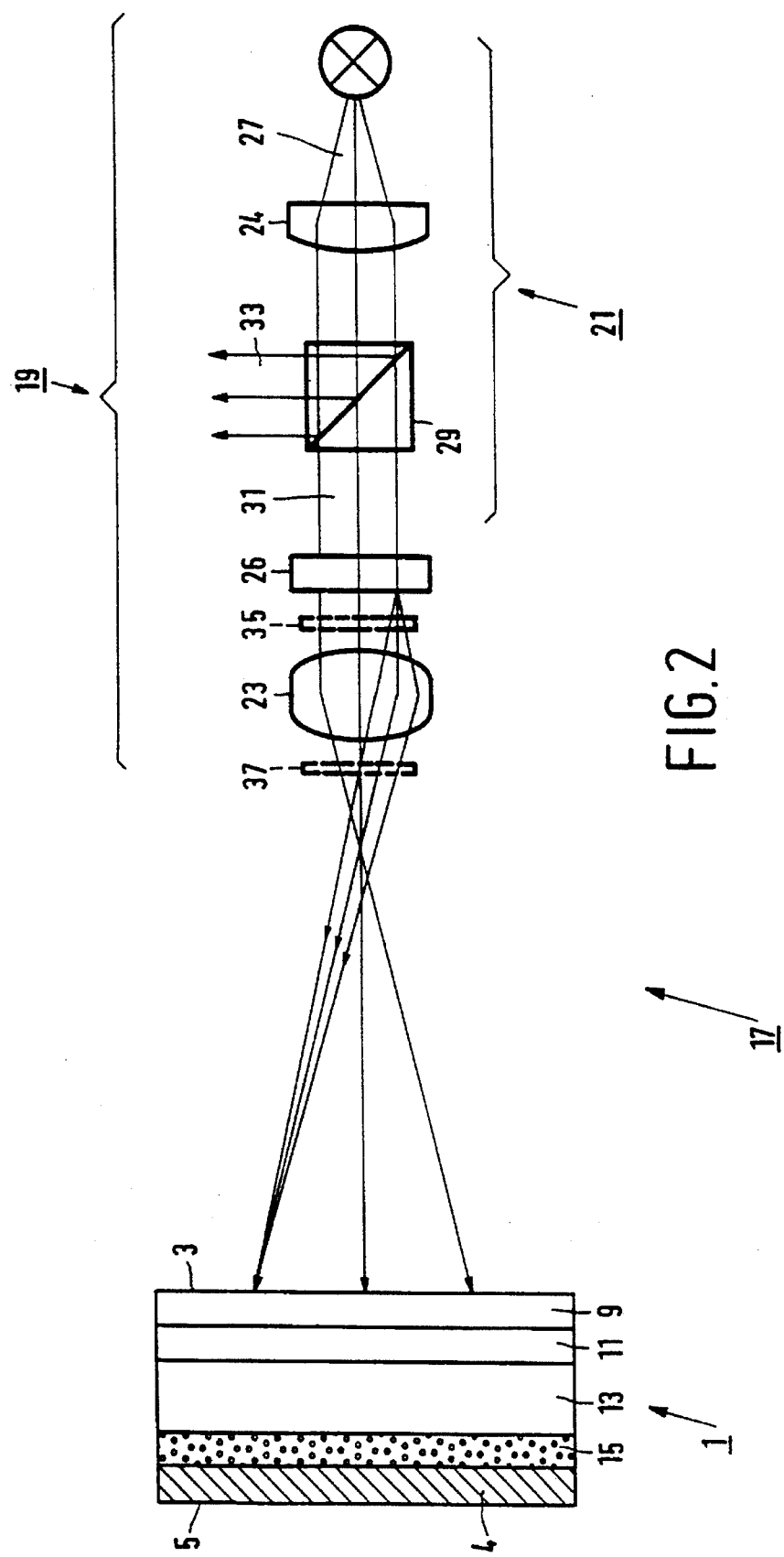
FIG. 2 shows an embodiment of an image projection system with an image display system supplying polarized radiation and a reflecting image projection screen according to the invention.

The image projection system 17 shown diagrammatically in FIG. 2 comprises a reflecting image projection screen 1 as described hereinbefore and an image projector 19 which emits a light beam having a defined direction of polarization for projecting an image on the projection screen 1. The image projector 19 comprises an illumination system 21, an image display system 26 and a projection lens system 23 which, for the sake of simplicity, is represented by a single projection lens. The image display system 26 has, for example an image display panel which may be implemented, for example as a liquid-crystal panel constituted by a layer of liquid crystalline material enclosed between two transparent plates. Such panels, whose operation is based on changing or not changing, dependent on the image to be displayed, of the state of polarization of the radiation passing through these panels, should be irradiated with radiation having a defined state of polarization. To this end the unpolarized radiation 27 which is emitted by the radiation source 25 and concentrated by a condensor lens system 24, is split, for example by a polarization-sensitive beam splitter 29, into two mutually perpendicularly polarized components 31 and 33, of which, for example the p-polarized beam 31 is incident on the image display panel 26.

If a monochromatic image is to be projected, the image display system has only one liquid-crystal panel.

If the image projection system is a color image projection system, the image display system 26 may comprise, for example three liquid-crystal panels, one for each of the primary colors of red, green and blue, and also a number of dichroic mirrors which split the beam into a red, a green and a blue beam each being incident on an associated panel. The beams passing through these panels are combined by a further set of dichroic mirrors to one beam which is incident on the projection lens system.

A color image projection system may also be implemented with one liquid-crystal panel only. In that case, use can be made of a pattern of color filters arranged in front of the image elements, as described in U.S. Pat. No. 5,029,986.

An active-drive or a passive-drive image display panel can be used. Both types of direct-drive image display panels are described in, for example European Patent Application EP 0 266 184.

The image generated by means of the image display system 26 is subsequently magnified by the projection lens system 23 and imaged on the projection screen 1.

Instead of using a polarization-sensitive beam splitter, as shown in FIG. 2, with substantially 50% of the radiation emitted by the radiation source being lost, a special composite prism as described in U.S. Pat. No. 5,184,248 is preferably used. The prism described in this Patent is constituted by two prisms, for example of glass with a birefringent layer in between, for example of liquid crystalline material. For a more detailed description of the beam splitter reference is made to said United States Patent. When such a beam splitter is used, the two polarization components of the source light are used for illuminating the image display panel.

Figure 3:
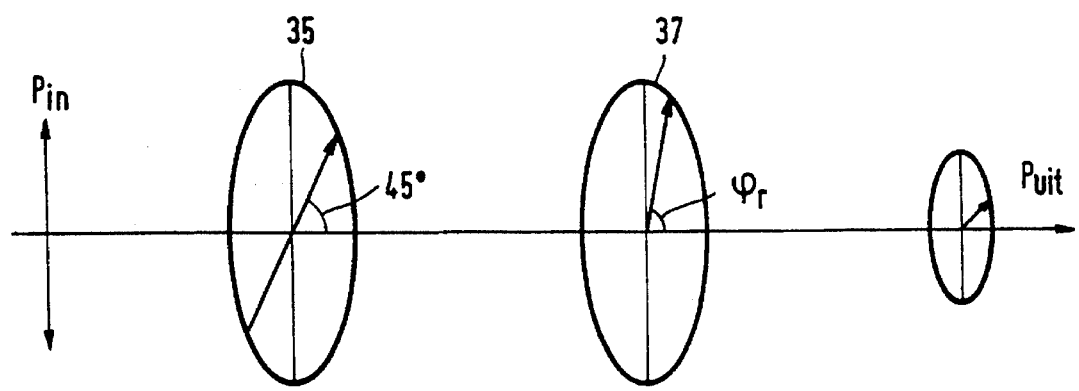
FIG. 3 shows the rotation of the direction of polarization by means of two achromatic $\lambda/4$ plates.

Since the direction of polarization of image projection screens is not standardized, it is desirable to have a facility of rotating the direction of polarization of the linearly polarized radiation from the projector 19 before the radiation reaches the image projection screen 1 by arranging an adjustable polarization rotator, for example comprising two λ/4 plates arranged one behind the other in the light path of the linearly polarized light. The second plate is rotatable so as to adapt the direction of polarization of the projection beam to the direction of polarization of the polarizer on the image projection screen. This conversion of the state of polarization is illustrated in FIG. 3. From a first λ/4 plate 35 which is arranged, for example in the light path between the image display system 26 and the projection lens, the direction of polarization extends at an angle of 45° to the incident direction of polarization $P_{in}$. λ is the central wavelength of the radiation beam. This λ/4 plate 35 converts the linearly polarized radiation into circularly polarized radiation. Subsequently, the circularly polarized radiation is incident on a second λ/4 plate 37 which is arranged, for example along the outer side of the projector in front of or on the projection lens. The radiation is again linearly polarized by this λ/4 plate 37. By varying the orientation $\phi_r$ of the second λ/4 plate 37 with respect to the incident direction of polarization $P_{in}$, the direction of polarization $P_{out}$ of the exiting beam can be adjusted. In this way the direction of polarization of the projection beam can be adapted to the direction of polarization of the image projection screen.

Since it is optionally possible to arrange the two λ/4 plates 35 and 37, they are shown in broken lines in FIG. 2.

In the present-day image display systems, LCD panels are preferably used which, dependent on the energization of a given pixel, convert linearly polarized radiation having a given direction of polarization into linearly polarized radiation having a second direction of polarization perpendicular to the first direction of polarization. If the LCD panel operates with circularly polarized radiation, the second λ/4 plate can be arranged between the beam splitter 29 and the image display system 26. The direction of polarization is then adapted before the radiation beam is modulated by the LCD panel.

If a color image is projected, the λ/4 plates 11, 35 and 37 should be active as polarization rotators in the complete visible wavelength range. Such wide-band λ/4 plates are known per se and are described, for example in the publication: "Retardation Film for STN-LCDs 'NRF'" by the firm of Nitto Denko in SID '92 Exhibit Guide, Society for Information Display, May 17–22, 1992, Boston, Mass., USA.

A wide-band λ/4 plate is a transparent element which is composed of, for example a plurality of layers and rotates the phase in a beam for all wavelengths (λ) in the visible wavelength range to such an extent that circularly polarized radiation is converted into linearly polarized radiation, or conversely.

I claim:

1. A reflecting image projection screen comprising a linear polarizer and a reflecting layer for reflecting radiation which is incident on the reflecting layer via the polarizer, characterized in that the reflecting layer is a depolarizing diffuser layer and in that the image projection screen includes a cholesteric filter between the polarizer and the reflecting layer and a λ/4 plate between the polarizer and the cholesteric filter, the direction of polarization of the radiation from the cholesteric filter corresponding to the direction of polarization of the polarizer after conversion by the λ/4 plate.

2. A reflecting image projection screen as claimed in claim 1, characterized in that the reflecting layer is implemented as a beaded screen.

3. A reflecting image projection screen as claimed in claim 1, characterized in that the cholesteric filter is active in at least an essential part of the complete visible wavelength range.

4. A reflecting image projection screen as claimed in claim 3, characterized in that the cholesteric filter is composed of a plurality of layers of liquid crystalline material, each layer being active for a different wavelength band, which wavelength bands jointly cover substantially the visible wavelength range.

5. A reflecting image projection screen as claimed in claim 3, characterized in that the cholesteric filter has a single layer of liquid crystalline polymer material, within which layer the pitch of the molecular helix varies across the layer thickness between two values which correspond to the lower limit and the upper limit, respectively, of the wavelength band which is required to cover at least the complete visible wavelength range.

6. A reflecting image projection screen as claimed in claim 4, characterized in that at least a plurality of layers of the cholesteric filter comprises a liquid crystalline polymer material, within which layers the pitch of the molecular helix varies across the layer thickness between two values which correspond to the lower limit and the upper limit, respectively, of the reflection band of the relevant layer.

7. An image projection system comprising an image projector provided with an image display system for modulating a radiation beam in conformity with the generated image and a reflecting image projection screen, characterized in that the projection screen is a screen as claimed in claim 1 and in that the direction of polarization of the radiation supplied by the image projector corresponds to the direction of polarization of the linear polarizer in the projection screen.

8. An image projection system as claimed in claim 7, characterized in that an adjustable polarization rotator is arranged in the light path between the illumination system and the image projection screen.

9. An image projection system as claimed in claim 8, characterized in that the adjustable polarization rotator comprises a first and a second λ/4 plate, the first λ/4 plate being oriented at an angle of 45° with respect to the direction of polarization of the light beam supplied by the projector and the second λ/4 plate being rotatable so as to adapt the direction of polarization supplied by the image projector to the direction of polarization of the reflecting image projection screen.

10. A reflecting image projection screen as claimed in claim 2, characterized in that the cholesteric filter is active in at least an essential part of the complete visible wavelength range.

11. An image projection system comprising an image projector provided with an image display system for modulating a radiation beam in conformity with the generated image and a reflecting image projection screen, characterized in that the projection screen is a screen as claimed in claim 2 and in that the direction of polarization of the radiation supplied by the image projector corresponds to the direction of the polarization of the linear polarizer in the projection screen.

12. An image projection system comprising an image projector provided with an image display system for modulating a radiation beam in conformity with the generated image and a reflecting image projection screen, characterized in that the projection screen is a screen as claimed in claim 3 and in that the direction of polarization of the radiation supplied by the image projector corresponds to the direction of the polarization of the linear polarizer in the projection screen.

13. An image projection system comprising an image projector provided with an image display system for modulating a radiation beam in conformity with the generated image and a reflecting image projection screen, characterized in that the projection screen is a screen as claimed in claim 4 and in that the direction of polarization of the radiation supplied by the image projector corresponds to the direction of the polarization of the linear polarizer in the projection screen.

14. An image projection system comprising an image projector provided with an image display system for modulating a radiation beam in conformity with the generated image and a reflecting image projection screen, characterized in that the projection screen is a screen as claimed in claim 5 and in that the direction of polarization of the radiation supplied by the image projector corresponds to the direction of the polarization of the linear polarizer in the projection screen.

15. An image projection system comprising an image projector provided with an image display system for modulating a radiation beam in conformity with the generated image and a reflecting image projection screen, characterized in that the projection screen is a screen as claimed in claim 6 and in that the direction of polarization of the radiation supplied by the image projector corresponds to the direction of the polarization of the linear polarizer in the projection screen.

* * * * *